United States Patent
Korenblit et al.

(10) Patent No.: US 8,947,769 B1
(45) Date of Patent: Feb. 3, 2015

(54) TUNABLE THREE LEVEL TERAHERTZ MAGNON LASER GENERATOR WITH ANTENNA

(75) Inventors: Yehiel Korenblit, Netanya (IL); Boris G. Tankhilevich, Walnut Creek, CA (US)

(73) Assignee: Terahertz Technologies LLC, Walnut Creek, CA (US)

( * ) Notice: Subject to any disclaimer, the term of this patent is extended or adjusted under 35 U.S.C. 154(b) by 813 days.

(21) Appl. No.: 13/181,488

(22) Filed: Jul. 12, 2011

Related U.S. Application Data (63) Continuation of application No. 12/315,424, filed on Dec. 2, 2008, now Pat. No. 7,986,454, which is a continuation-in-part of application No. 12/290,527, filed on Nov. 1, 2008, now Pat. No. 8,031,397, which is a continuation-in-part of application No. 11/701,284, filed on Jan. 31, 2007, now Pat. No. 7,508,578, which is a continuation-in-part of application No. 11/481,197, filed on Jul. 3, 2006, now Pat. No. 7,430,074.

(51) Int. Cl.
  *H01S 5/50* (2006.01)
  *H01S 4/00* (2006.01)
  *H01S 1/02* (2006.01)
  *H01L 43/00* (2006.01)

(52) U.S. Cl.
  CPC .. *H01S 1/02* (2013.01); *H01L 43/00* (2013.01)
  USPC .......................... 359/342; 372/37; 372/43.01

(58) Field of Classification Search
  CPC ........... H01S 1/02; H01L 43/00; H01L 43/12; H01L 49/00
  USPC ................................. 359/342; 372/37, 43.01
  See application file for complete search history.

(56) References Cited

U.S. PATENT DOCUMENTS

| | | | |
|---|---|---|---|
| 3,822,410 | A | 7/1974 | Madey |
| 3,986,194 | A | 10/1976 | Masumoto et al. |
| 4,626,800 | A | 12/1986 | Murakami et al. |
| 4,679,023 | A | 7/1987 | Nelson |
| 4,914,665 | A | 4/1990 | Sorin |
| 6,111,416 | A | 8/2000 | Zhang et al. |
| 6,230,038 | B1 | 5/2001 | von Gutfeld et al. |

(Continued)

FOREIGN PATENT DOCUMENTS

JP    S44-032119 B    12/1969

OTHER PUBLICATIONS

Tankhilevich et al. "Magnon Laser", 6th International Workshop on Multifunctional Materials, Jul. 31-Aug. 3, 20, Kodiak, Alaska, pp. 33.

(Continued)

*Primary Examiner* — Eric Bolda
(74) *Attorney, Agent, or Firm* — Boris G Tankhilevich (57) ABSTRACT

An apparatus for tunable generation of terahertz photons is provided. The apparatus comprises a three level magnon laser, an injection means, a terahertz antenna, and a tuning means. The terahertz antenna further comprises a magnon gain medium that supports generation of nonequilibrium magnons. The magnon gain medium is selected from the group consisting of: a ferromagnetic semiconductor; a dilute magnetic semiconductor (DMS); a half-metallic ferromagnet (HMF); and a ferromagnetic conductor, with a gap in the density of states of the minority electrons around the Fermi energy.

22 Claims, 3 Drawing Sheets

(56) References Cited

U.S. PATENT DOCUMENTS

| | | |
|---|---|---|
| 6,365,286 B1 | 4/2002 | Inomata |
| 6,614,827 B1 | 9/2003 | Mooradian |
| 6,912,148 B2 | 6/2005 | Hannah et al. |
| 6,943,651 B2 | 9/2005 | Mukaiyama et al. |
| 6,988,058 B1 | 1/2006 | Sherwin et al. |
| 2001/0031547 A1 | 10/2001 | Ohno et al. |
| 2002/0058120 A1 | 5/2002 | Uchida et al. |
| 2003/0021908 A1 | 1/2003 | Nickel et al. |
| 2004/0094801 A1 | 5/2004 | Liang et al. |
| 2005/0242287 A1 | 11/2005 | Hakimi |
| 2006/0060815 A1 | 3/2006 | Punnoose |
| 2006/0088324 A1 | 4/2006 | Fujimoto et al. |
| 2006/0108619 A1 | 5/2006 | Yoshida et al. |
| 2006/0238191 A1 | 10/2006 | Saito |

OTHER PUBLICATIONS

Tankhilevich et al. "The Terahertz Magnon Photon Laser Imaging System (TERMAPLIS)", NCI Conference: Cancer Detection and Diagnostic Technologies for Global Health, Aug. 22-23, 2011, Rockville, Maryland, p. 87.

U.S. Appl. No. 13/043,470, Notice of Allowance dated Jul. 30, 2013.

Tankhilevich et al. "Novel spintronic device: terahertz magnon-photon laser", Journal of Physics: Conf. Ser. 263012004, 1st International Symposium on Spintronic Devices and Commercialization (ISSDC2010), IOP Publishing, Feb. 2011.

Tankhilevich et al. "Terahertz Imaging and Spectroscopy: Advances in Power and Tunability", Proceedings of the 2010 World Molecular Imaging Congress, vol. 12, Suppl 2, pp. S1340, Dec. 2010.

U.S. Appl. No. 12/661,153, Notice of Allowance dated Mar. 17, 2011.

U.S. Appl. No. 12/315,424, Notice of Allowance dated Mar. 21, 2011.

U.S. Appl. No. 12/290,527, Notice of Allowance dated Jun. 27, 2011.

U.S. Appl. No. 12/290,527, Office Action dated Dec. 3, 2010.

U.S. Appl. No. 12/290,527, Office Action dated Oct. 1, 2010.

Korenblit et al. "High Frequency Magnon Generation by NonEquilibrium Electrons and the Instability of the Magnon System", Physics Letters, vol. 64A, No. 3, pp. 307-308, Dec. 1977.

Korenblit et al. "Generation of High-Frequency Magnons by NonEquilibrium Electrons Polarized Opposite to the Direction of Magnetization", Soviet Physics, JETP, vol. 46(6), pp. 1167-1175, Dec. 1977.

Korenblit et al. "Generation of High-Frequency Magnons in a Ferromagnetic Semiconductor", Pis'ma Zh. Eksp. Teor. Fiz. 24, No. 11, pp. 598-601, Dec. 5, 1976.

Korenblit et al. "Heating and Generation of Magnons by NonEquilibrium Electrons in Ferromagnetic Semiconductors", Soc. Sci. Re. A. Phys., 1987, pp. 447-517, vol. 8, Harwood Academic Publisher GmbH.

Bierlein et al. "Harmonic Generation and Parametrically Coupled Spin Waves in Yttrium Iron Garnet", Physical Review B, Jun. 1, 1970, pp. 4342-4357, vol. 1, No. 11.

Kaganov et al. "NonResonance Absorption of Oscillating Magnetic Field Energy by a Ferromagnetic Dielectric", Soviet Physics JETP, Mar. 1960, pp. 587-592, vol. 37(10), No. 3.

Lascaray et al. "Bound Magnetic Polaron Evidence in EuO", Solid State Communications, 1976, pp. 677-679, vol. 19, Pergamon Press.

Passell et al. "Neutron Scattering From the Heisenberg Ferromagnets EuO and EuS. I. The Exchange Interactions", Physical Review B, Dec. 1, 1976, pp. 4897-4907, vol. 14, No. 11.

Tsoi et al. "Generation and Detection of Phase-Coherent Current-Driven Magnons in Magnetic Multilayers", Letters to Nature, Nature, Jul. 6, 2000, p. 46-48, vol. 406, Macmillan Magazines L.

Schoenes et al. "Exchange Optics in Gd-doped EuO", Physical Review B, Apr. 1, 1974, pp. 3097-3105, vol. 9, No. 7.

Belhadi et al. "Spin Wave Modes and Magnon Scattering At Surface Nanostructure on 2D Heisenberg Ferromagnets", Surface Review and Letters, 2004, p. 99-109, vol. 11, No. 1.

Lisowski, "Electron and Magnetisation Dynamics in Metals Studied by Time-Resolved Photoemission", Dissertation Abstract, Freie Universitat Berlin, Jan. 2006, Berlin Germany.

Radu, "Ultrafast Electron, Lattice and Spin Dynamics on Rare-Earth Metal Surfaces", Thesis, Freie Universitat Berlin, Mar. 2006, Berlin Germany.

Srivastava, "Optically Detected Terahertz Resonance Spectroscopy of Semiconductor Nanostructures", Thesis, Rice University, Apr. 2005, Houston Texas.

TUNABLE THREE LEVEL TERAHERTZ MAGNON LASER GENERATOR WITH ANTENNA

This is a continuation of the U.S. patent application Ser. No. 12/315,424, filed on Dec. 2, 2008, and entitled "TUNABLE TERAHERTZ GENERATOR USING A MAGNON GAIN MEDIUM WITH AN ANTENNA", now U.S. Pat. No. 7,986,454, which is a continuation-in-part of the U.S. patent application Ser. No. 12/290,527, filed on Nov. 1, 2008, and entitled "MAGNON LASER AT ROOM TEMPERATURES", which is a continuation-in-part of the U.S. patent application Ser. No. 11/701,284, filed on Jan. 31, 2007 now U.S. Pat. No. 7,508,578 and entitled "MAGNON LASER", which is a continuation-in-part of the parent U.S. patent application Ser. No. 11/481,197 filed on Jul. 3, 2006, now U.S. Pat. No. 7,430,074 "GENERATION OF TERAHERTZ WAVES".

TECHNICAL FIELD

The technology relates to magnon laser effect.

BACKGROUND

In the parent U.S. Pat. No. 7,430,074 "GENERATION OF TERAHERTZ WAVES" the generation of nonequilibrium magnons was disclosed. In the U.S. patent application Ser. No. 11/701,284, filed on Jan. 31, 2007 and entitled "MAGNON LASER", the generation of nonequilibrium magnons was described by using a general laser analogy. In the U.S. patent application Ser. No. 12/290,527, filed on Nov. 1, 2008, and entitled "MAGNON LASER AT ROOM TEMPERATURES", a magnon laser that utilizes a magnon gain medium at room temperatures was disclosed.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An apparatus for tunable terahertz photon generation is proposed. The apparatus comprises a three level magnon laser, an injection means, a terahertz antenna, and a tuning means for tuning frequency of terahertz photons emitted by the terahertz antenna.

The terahertz antenna further comprises a magnon gain medium that supports generation of nonequilibrium magnons. The magnon gain medium is selected from the group consisting of: a ferromagnetic semiconductor; a dilute magnetic semiconductor (DMS); a half-metallic ferromagnet (HMF); and a ferromagnetic conductor, with a gap in the density of states of the minority electrons around the Fermi energy.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Recently some dilute magnetic semiconductors (DMS), with Tc above room temperature, have been studied intensively. These are oxides doped with magnetic cations. The examples are: GaN, doping Mn—9%, Tc=940 K; AN, doping Cr—7%, Tc>600 K; TiO2 (anatase), doping Co—7%, Tc=650 K; SnO2, doping Co—5%, Tc=650 K. These magnets can be used as a magnon gain medium to generate nonequilibrium magnons and photons at room temperatures.

Another system that can be used as a magnon gain medium is a system comprising a half-metallic ferromagnet (HMF). Half-metallic ferromagnets (HMF) are ferromagnetic conductors, with a gap in the density of states of the minority electrons around the Fermi energy, $E_f$. Thus, the electrons in these materials are supposed to be 100% spin polarized at $E_f$. Thermal effects and spin-orbital interactions reduce the electron polarization. However, the electron polarization is close to 100% in half-metallic ferromagnets with spin-orbital interaction smaller than the minority electron gap and at temperatures much lower than the Curie temperature Tc.

Half-metallic ferromagnets (HMF) form a quite diverse collection of materials with very different chemical and physical properties.

Chromium dioxide, $CrO_2$. Tc=390 K. Magnetic moment per Cr=2 μB. The polarization measured at low temperatures is close to 100%. There are some other known half-metallic ferromagnetic oxides, e.g. $Sr_2FeMoO_6$.

Heusler alloys. Most of the predicted HMF is Heusler alloys. In general, these are ternary $X_2YZ$-compounds, X and Y are usually transition metals and Z is a main group element. The most studied of them is NiMnSb: Tc=728K, magnetic moment close to 4 μB. Experiments show that NiMnSb is a half-metallic ferromagnet at low temperatures. But there is evidence that at T≈90K a phase transition into a usual ferromagnetic state takes place, and it seems unlikely that NiMnSb is a half-metallic ferromagnet near room temperature.

There are many other Heusler alloys with half-metallic ferromagnet properties, like: (1) $Co_2MnSi$ having Tc of 1034K and magnetic moment of 5 μB; (2) $Co_2MnGe$ having Tc of 905K and magnetic moment close to 5 μB; and (3) $Co_2MnSn$ having Tc of 826K and magnetic moment of 5.4 μB; etc.

It has been shown recently (S. Wurmehl et al., *PRB* 72, 184434 (2005)), that the alloy with the highest magnetic moment and Tc is $Co_2FeSi$ having Tc of 1100 K (higher than for Fe), and having magnetic moment per unit cell of 6 μB. The orbital contribution to the moments is small, while the exchange gap is large, of order 2 eV. Therefore, the effect of thermal fluctuations and spin-orbit interaction on the electron polarization is negligible. One should expect, therefore, that the electrons in $Co_2FeSi$ are polarized at high temperatures, sufficiently close to Tc. Indeed, according to the experiment the magnetic moment at 300 K is the same as at 5K.

Colossal magnetoresistance materials: $La_{1-x}Sr_xMnO_3$ (for intermediate values of x) is presumably a half-metallic ferromagnet having Tc close to room temperature. Photoelectron emission experiments confirm the half-metallicity of $La_{0.7}Sr_{0.3}MnO_3$, with Tc=350 K. The polarization degree at T=40K is 100±5%; the gap for the minority spins is 1.2 eV.

Note that HMF, as well as ferromagnetic semiconductors, differ from "normal" metallic ferromagnets by the absence of one-magnon scattering processes. Therefore, spin waves in HMF, as well as in magnetic insulators, are well defined in the entire Brillouin zone. This was confirmed by neutron scattering experiments performed on some Heusler alloys. For references, please see: (1) Y. Noda and Y. Ishikawa (*J. Phys. Soc. Japan* v. 40, 690, 699 (1976)) have investigated the following Heusler alloys: $Pd_2MnSn$ and $Ni_2MnSn$. (2) K. Tajima et al. (*J. Phys. Soc. Jap.* v. 43, 483 (1977)), have investigated Heusler alloy $Cu_2MnAl$.

Hence, the magnon laser effect (disclosed in the parent U.S. Pat. No. 7,430,074 "GENERATION OF TERAHERTZ WAVES") can be observed (in at least some of the referenced above half-metals) at room temperatures.

However, in half-metals the spin-up electron with energy larger than the exchange gap will interact with the spin-up electrons with energy smaller than the gap. Since the number of the spin-up electrons is large (as compared to the number of spin-up electrons in ferromagnetic semiconductors) this interaction should lead to the fast thermalisation of high-energy electrons, which will prevent the reverse process of absorption of magnons by electrons with spin-up, which is crucial for existence of the magnon laser.

In other words, the electron bath in half-metallic ferromagnets could play the same role as the optical phonons in ferromagnetic semiconductors. However, in half-metallic ferromagnetic oxides the interaction of the electrons with spin-up with optical phonons could also play an important role.

Figure 1:
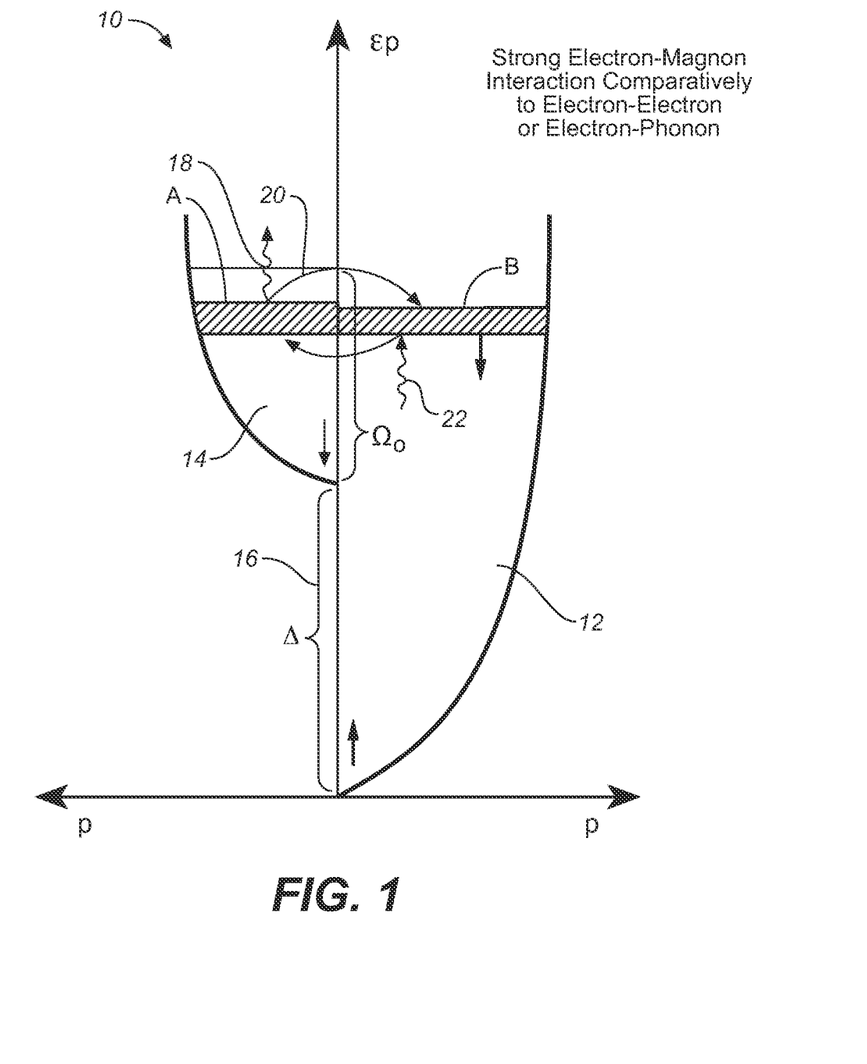
FIG. 1 illustrates process of strong electron-magnon interaction (comparatively with electron-electron or with electron-phonon interaction) wherein a nonequilibrium electron put in the upper subband with spin down rapidly emits a magnon with a large wave vector in accordance with an embodiment of the present technology.

As illustrated in FIG. 1 a nonequilibrium electron 20 put in the upper subband with spin down rapidly emits a magnon 18. Assuming that the emitted non-equilibrium magnon 18 still has quadratic spectrum, it has a large wave vector $q \approx \hbar^{-1}(2m\Delta)^{1/2}$, where m is the electron effective mass. It follows from the energy and momentum conservation laws that if the energy of this electron, $\in_p$, measured from the bottom of the spin down subband is much smaller than $\Delta$, the wave vector of the emitted magnon, q lies in the interval $q_1 \leq q \leq q_2$, where $q_{1,2} = \hbar^{-1}(p_0 \pm p)$, $p_0 = (2m\Delta)^{1/2}$, $p = (2m\in_p)^{1/2} << p_0$. The frequency of these magnons may be in the Terahertz region.

The ratio of the magnon generation rate, $\Gamma_e(\vec{q})$, to the rate of $\Gamma_m(\vec{q})$, their relaxation (in collisions with equilibrium magnons) is a function of the wave vector $\vec{q}$. Therefore the nonequilibrium magnon distribution function, $N(\vec{q})$ has a maximum at some wave vector $\vec{q}=\vec{q}*$. $N(\vec{q})$ increases with the increase of the electron pumping, and because of the simulated emission of magnons, the function $N(\vec{q})$ grows most rapidly at $\vec{q}$ close to $\vec{q}*$.

When the pump reaches some critical value, $N(\vec{q}*)$ starts to increase very fast with the increase of the electron pumping. At some conditions the generation of magnons with $\vec{q}=\vec{q}*$ becomes avalanche-like, and the magnon system becomes unstable. For more details, please see U.S. Pat. No. 7,430,074 "GENERATION OF TERAHERTZ WAVES", and equations below.

Basic Equations for Magnon Generation.

The system of equations which govern the behavior of the electron, $f_\downarrow(\vec{p})$, and magnon, $N(\vec{q})$ distribution functions were obtained in the following paper: I. Ya. Korenblit and B. G. Tankhilevich, Sov. Phys.—JETP, 46, 1167 (1977). They read $$[1+N(\vec{q})]\Gamma_e(\vec{q})]-[N(\vec{q})-N^{(0)}(\vec{q})]\Gamma_m(\vec{q})=0$$

$$f_\downarrow(\vec{p})\gamma_{em}(\vec{p})=g(\in_p). \tag{Eqs. 1}$$

Here $\Gamma_e(\vec{q})$ is the rate of relaxation of magnons in collisions with electrons $$\Gamma_e(\vec{q})=4\pi\hbar^{-1}I^2Sv_0\int d^3p(2\pi\hbar)^{-3}\delta(\gamma_\uparrow(\vec{p}-\hbar\vec{q})|\in_{\vec{p}\downarrow}-\hbar\omega_{\vec{q}}-\in_{\vec{p}-\hbar\vec{q},\uparrow})f_\downarrow(\vec{p}), \tag{Eq. 2}$$

where $v_0$ is the unit cell volume.

$\gamma_{em}$ is the electron-magnon relaxation rate:

$$\gamma_{em}(\vec{p})=4\pi\hbar^{-1}I^2Sv_0\int d^3q(2\pi\hbar)^{-3}\delta(\gamma_\uparrow(\vec{p}-\hbar\vec{q})|\in_{\vec{p}\downarrow}-\hbar\omega_{\vec{q}}-\in_{\vec{p}-\hbar\vec{q},\uparrow})(1+N(\vec{q})) \tag{Eq. 3}$$

The smeared δ-function, $\delta(\gamma|\in)$, takes into account the finite lifetime of the electrons in the final state, caused by the interaction with electrons with spin-up (or by the interaction with optical phonons). In the case of electron thermalisation due to interaction with optical phonons $$\delta(\gamma|\varepsilon) = \frac{1}{\pi}\frac{\hbar\gamma}{(\varepsilon^2+\hbar^2\gamma^2)} \tag{Eq. 4}$$

The rate $\gamma_\uparrow(p, \in_p)$ is the known electron damping rate due to the emission of longitudinal optical phonons (22 of FIG. 1). For electrons with energy $\in_p$ close to $\Delta$, this rate is given by $$\gamma_\uparrow(\in_p)=(\pi/2)\alpha\Omega(\Omega/\Delta)^{1/2}\ln(4\Delta/\Omega)<<\Delta. \tag{Eq. 5}$$

Here $\Omega$ is the energy of an optical phonon, and a is the strength of the electron-phonon interaction.

The function $g(\in)$ is the generation function of electrons, with spin down. We shall treat it as a δ-function $$g(\in_p)=g_0\in\delta(\delta-\in_p). \tag{Eq. 6}$$

We suppose in what follows that the energy $\in$ is small, $\in<<\Delta$.

The second term in the l.h.s. in the first of Eqs. (1) describes the relaxation of nonequilibrium magnons in collisions with equilibrium ones, under the assumption that $N(\vec{q})$, is close to its equilibrium value, $$N^{(0)}(\vec{q}) = [e^{(\hbar \omega_q/kT)} - 1]^{-1}. \quad \text{(Eq. 7)}$$

$\Gamma_m(\vec{q})$ is the magnon-magnon relaxation rate. From Eqs. (1) we obtain the following integral equation for $N(\vec{q})$, $$\Gamma_e(\vec{q}) = g_0 \in \int d^3p \delta(\gamma_\uparrow(\vec{p} - \hbar \vec{q}) | \in_{\vec{p}-} \hbar_{\vec{q},\uparrow}) \delta(\in - \in_p) Z^{-1}(\vec{p}), \quad \text{(Eq. 8)}$$

where $$\Gamma_e(\vec{q}) = g_0 \in \int d^3p \delta(\gamma_\uparrow(\vec{p} - \hbar \vec{q}) | \in_{\vec{p}\downarrow} - \hbar \omega_{\vec{q}} - \in_{\vec{p}-} \hbar_{\vec{q},\uparrow}) \delta(\in - \in_p) Z^{-1}(\vec{p}), \quad \text{(Eq. 9)}$$

and $$Z(\vec{p}) = \int d^3q \delta(\gamma_\uparrow(\vec{p} - \hbar \vec{q}) | \in_{\vec{p}\downarrow} - \hbar \omega_{\vec{q}} - \in_{\vec{p}-} \hbar_{\vec{q},\uparrow})(1 + N(\vec{q})). \quad \text{(Eq. 10)}$$

Eq. (8) is formally reminiscent of the expression for the magnon distribution function under conditions of parametric pumping. The difference is that here the rate $\Gamma_e$ is itself a functional of $N(\vec{q})$, since the number of the emitted magnons depends on the distribution function of the electrons with spin down, $f_\downarrow$, which according to Eqs. (2) and (3) is in its turn determined not only by the pump $g(\in_p)$ but also by a certain average (10) over the magnon distribution function. The behavior of $N(\vec{q})$ is therefore different from that in the case of parametric pumping.

$N(\vec{q})$ for Strong Pumping. Isotropic Case.

Let us assume for simplicity that the magnon and electron spectra are isotropic. Then $\Gamma_e(q)$ and $\Gamma_m(q)$ do not depend on the direction of $\vec{q}$. The relaxation rate $\Gamma(q)$ is usually a power function of q, and it can be written as $$\Gamma_m(q) = \Gamma_m(p_0)(\hbar q/p_0)^t. \quad \text{(Eq. 11)}$$

More specifically, if $\Gamma_m(q)$ is determined by magnon-magnon exchange scattering, then t=4 for magnons, with energy $\hbar \omega(q_0)$ larger than kT, and t=3 for magnons, with energy $\hbar \omega(q_0)$ smaller than kT.

The strong pumping regime sets in, when $g_0$ exceeds a critical value $G_c$. If the damping of electrons is due to interaction with optical phonons (and is less than $(\in\Delta)^{1/2}$), this critical value is given by $$G_c = 2g_c/(t+1),$$

$$g_c = (\Delta/\in)^{3/2}\Gamma_m(q_0)[1 + N^{(0)}(q_0)]. \quad \text{(Eqs. 12)}$$

At $g_0 > G_c$ the function N(q) increases exponentially with pumping $$N(q) = [1 + N^{(0)}(q_0)](p_0/2p_\in(t+1))\exp(g_0/G_c), \quad \text{(Eq. 13)}$$

if q falls into the smooth region $$p_0 - p_\in \leq \hbar q \leq p_0 - p_\in + \delta \hbar q,$$

$$\delta \hbar q = 2p_\in \exp(-g_0/G_c), \quad \text{(Eqs. 14)}$$

while N(q) with wave vectors outside of the above-given range does not depend on the pump. Thus, under sufficiently strong pumping the magnon distribution function has a sharp peak at $\hbar q \approx p_0 - p_\in$.

Let us define the number of electrons, β, pumped per second per unit cell as:

$$\beta = v_0(2\pi \hbar)^{-3}\int d^3p g(\in_p). \quad \text{(Eq. 15)}$$

One gets for the pumping given by Eq. (6)

$$\beta = (v_0 \in^{3/2} m^{3/2} g_0/2^{1/2}\pi^2 \hbar^3) \quad \text{(Eq. 16)}$$

and the critical pumping $\beta_c$, with $g_0 = G_c$ is $$\beta_c = (v_0 q^3_0/(2(t+1)\pi^2))\Gamma_m(q_0)[1 + N^{(0)}(q_0)]. \quad \text{(Eq. 17)}$$

Since we are interested in high-frequency magnons, we suppose that their relaxation is mainly due to four-magnon exchange interaction. Using the expressions for $\Gamma_m$ given in the following reference (V. G. Vaks, A. I. Larkin and S. A. Pikin, JETP 53 (1967)), we estimated for $T/T_c \approx 0.2$, and $\hbar \omega(q_0) > kT$, $N^{(0)}(q_0) \ll 1$: $\Gamma_m \approx (10^8 - 10^9) \text{ sec}^{-1}$.

Thus, it follows from Eq. (17) the estimate $\beta_c \approx (10^5 - 10^7) \text{ sec}^{-1}$, and we took into account that $N^{(0)}(q_0)$ is small.

The physical meaning of the critical pumping $G_c$ can be understood as follows. The ratio $\Gamma_e/\Gamma_m$ of the rate of generation of the magnons to the rate of their relaxation reaches its maximum value at $\hbar q = p_0 - p_\in$ and has its minimum at $\hbar q = p_0 + p_\in$, i.e. there is an excess generation on the left end of the interval in comparison with the right end. Stimulated emission causes the increase of this asymmetry. Nonlinear generation begins when the difference between the number of nonequilibrium magnons at the ends of the generation interval becomes equal to the number of equilibrium magnons, if $N^{(0)} > 1$. On the other hand, nonlinear generation begins when the difference between the number of nonequilibrium magnons at the ends of the generation interval becomes equal to 1, if the opposite inequality ($N^{(0)} < 1$) holds.

Figure 2:
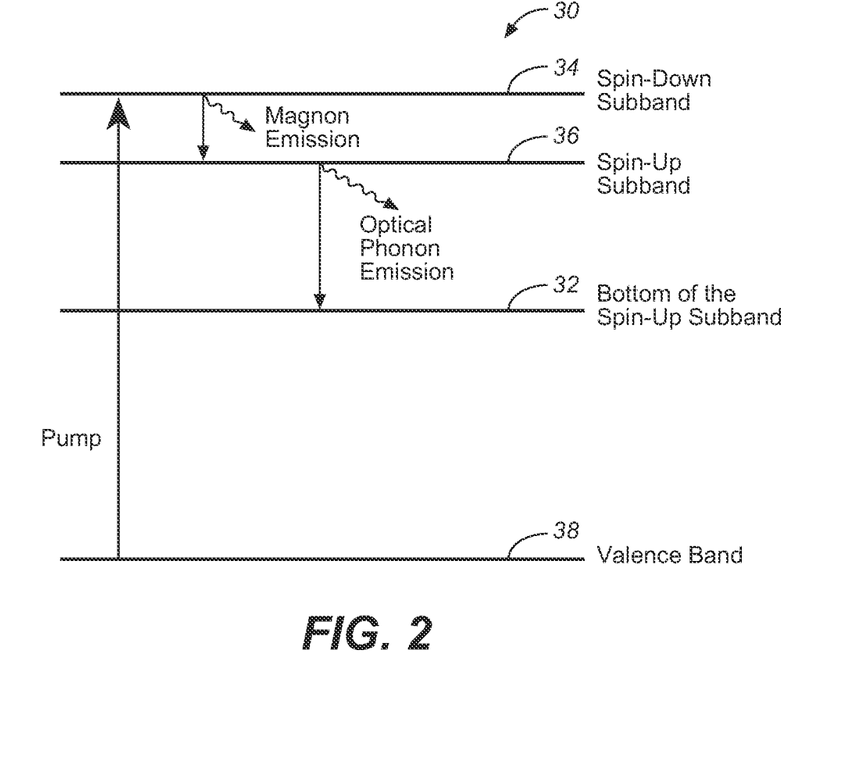
FIG. 2 shows the energy level structure of a four-level magnon laser operating at room temperatures in accordance with an embodiment of the present technology.

In an embodiment, FIG. 2 shows a diagram 30 that illustrates a four-level magnon laser of the present technology. In this embodiment of the present technology, the four-level magnon laser 30 further comprises a four-level energy structure further comprising: a lowest energy level 38 corresponding to a valence band, a highest energy level 34 corresponding to a spin-down subband, a first intermediate level 36 corresponding to the lower energy electron states in the spin-up subband, and a second intermediate energy level 32 corresponding to a spin-up subband.

The electrons pumped from the lowest energy level 38 into the highest energy level 34 move into the lower energy electron states (the first intermediate level 36) in the spin-up subband, wherein each pumped electron emits a magnon. The electrons in the spin-up subband move from the first intermediate state 36 into the bottom of the spin-up subband (the second intermediate energy level 32) by interacting with electrons with spin-up (or by emitting optical phonons). The electrons are pumped from the lowest energy level 38 into the highest energy level 34 by using a pumping means (84 of FIG. 4).

In an embodiment of the present technology, a conventional laser can be used as a pumping means to pump electrons form the lowest energy level (valence band) 38 into the highest energy level 34 (spin-down subband).

In an embodiment of the present technology, the four-level magnon laser (30 of FIG. 2) further comprises: a thermostat (88 of FIG. 4), wherein the ferromagnetic material is placed in the thermostat, and wherein the thermostat is configured to maintain temperature of the ferromagnetic material below a critical temperature.

Figure 3:
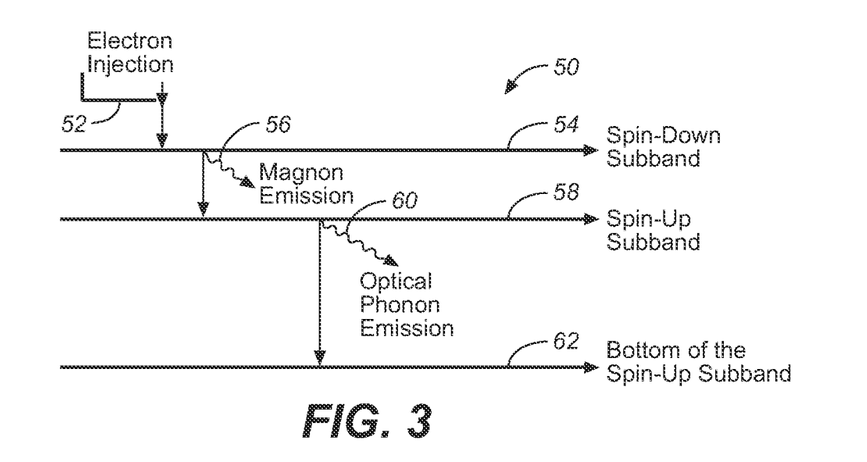
FIG. 3 depicts the energy level structure of a three-level magnon laser operating at room temperatures in accordance with an embodiment of the present technology.

In an embodiment, FIG. 3 depicts a three-level magnon laser 50 of the present technology further comprising a three-level laser structure further comprising: a highest energy level 54 corresponding to a spin-down subband, a lowest energy level 62 corresponding to a spin-up subband, and an intermediate energy level 58 corresponding to the lower energy electron states in the spin-up subband.

In this embodiment of the present technology, the electrons 52 injected from an external source of electrons (not shown)

into the highest energy level 54 move into the lower energy electron states in the spin-up subband 58, wherein each injected electron emits a magnon. The electrons in the spin-up subband move from the intermediate energy level 58 into the bottom of the spin-up subband 62 by emitting optical phonons.

In an embodiment of the present technology, the injection means (84 of FIG. 4) further comprises: an electric field applied to the ferromagnetic material. In an embodiment of the present technology, the injection means is configured to inject non-polarized electrons from an external source into the ferromagnetic material, wherein the injected spin-down electrons populate the highest energy level 54. In another embodiment of the present technology, the injection means is configured to inject polarized spin-down electrons from an external source into the highest energy level 54. The polarized spin-down electrons are polarized in the direction opposite to the direction of magnetization of the ferromagnetic material.

In an embodiment, the three-level magnon laser of the present technology (50 of FIG. 3) further comprises a thermostat (88 of FIG. 4), wherein the ferromagnetic material is placed in the thermostat, and wherein the thermostat is configured to maintain temperature of the ferromagnetic material below a critical temperature.

In an embodiment, the four-level magnon laser of the present technology (30 of FIG. 2) can be used for generation of nonequilibrium magnons by performing the following steps (not shown): (A) providing the four-level magnon laser; and (B) pumping electrons into the four-level magnon laser from the lowest energy level into the highest energy level by using a pumping means (84 of FIG. 4).

In an embodiment, the three-level magnon laser of the present technology (50 of FIG. 3) can be used for generation of nonequilibrium magnons by performing the following steps (not shown): (A) providing the three-level magnon laser; and (B) injecting electrons into the three-level magnon laser by using an injection means (84 of FIG. 4).

Figure 4:
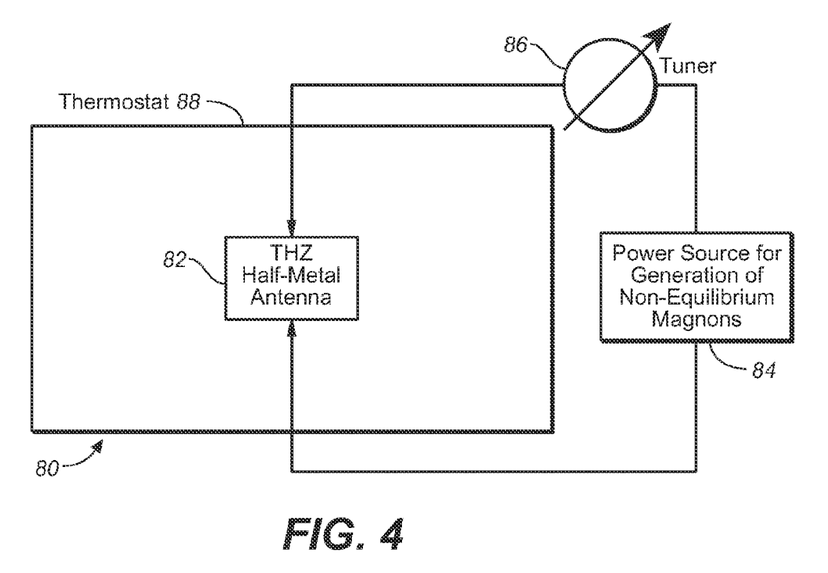
FIG. 4 illustrates an apparatus for tunable generation of terahertz photons comprising a terahertz antenna (placed in a thermostat) further comprising a magnon gain medium, a generator of non-equilibrium magnons (an electric field generator or a conventional laser), and a tuner in accordance with an embodiment of the present technology.

FIG. 4 illustrates an apparatus for tunable generation of terahertz photons 80 comprising a terahertz antenna 82 further comprising a magnon gain medium, a generator of non-equilibrium magnons 84 (an electric field generator or a conventional laser), and a tuner 86 in accordance with an embodiment of the present technology. The terahertz antenna 82 is placed in the thermostat 88.

As an example the terahertz antenna 82 can be implemented by using a log-periodic antenna element that is capable of operation in 1-6 THz. Please, see "Antenna Engineering Handbook" edited by John L. Volakis, fourth edition, Mc Graw Hill books, 2007, pages 23-12; 23-13. Many other designs of terahertz antennas (a patch—antenna, a micro machined waveguide antenna, etc), can be used to implement the apparatus for tunable generation of terahertz photons 80 of the present technology.

In accordance with an embodiment of the present technology, the terahertz antenna 82 of FIG. 4 comprises a half-metallic ferromagnet (HMF) terahertz antenna.

In accordance with an embodiment of the present technology, the terahertz antenna 82 of FIG. 4 further comprises a spin-polarized Heusler alloy terahertz antenna.

In accordance with an embodiment of the present technology, the terahertz antenna 82 of FIG. 4 further comprises a spin-polarized Colossal magnetoresistance material terahertz antenna.

In accordance with an embodiment of the present technology, the terahertz antenna 82 of FIG. 4 further comprises a $CrO_2$ terahertz antenna.

In accordance with an embodiment of the present technology, the terahertz antenna 82 of FIG. 4 further comprises a $Sr_2FeMoO_6$ terahertz antenna.

In accordance with an embodiment of the present technology, the terahertz antenna 82 of FIG. 4 further comprises a $Fe_3O_4$ terahertz antenna.

As was fully disclosed above, the generator of non-equilibrium magnons 84 (electrical field generator, or a conventional laser) applied to the terahertz antenna 82 comprising a magnon gain medium will generate non-equilibrium magnons in the terahertz antenna 82.

In the parent U.S. Pat. No. 7,430,074 "GENERATION OF TERAHERTZ WAVES", the generation of terahertz photons was caused by merging of non-equilibrium magnons in ferromagnetic dielectrics (like EuO). Therefore, the theory developed in the U.S. Pat. No. 7,430,074 is not directly applicable to the present technology that is focused on generation of terahertz photons caused by merging of non-equilibrium magnons in half-metals.

In metals, the generation of THz photons should be described by using Maxwell equations because the terahertz radiation experiences storing damping at distances equal to the photons wavelength in the metal, which is equal to the skin depth of the metals.

Skin depth is a measure of the distance an alternating current can penetrate beneath the surface of a conductor. When an electromagnetic wave interacts with a conductive material, mobile charges within the material are made to oscillate back and forth with the same frequency as the impinging fields. The movement of these charges, usually electrons, constitutes an alternating electric current, the magnitude of which is greatest at the conductor's surface. The decline in current density versus depth is known as the skin effect and the skin depth is a measure of the distance over which the current falls to 1/e of its original value. A gradual change in phase accompanies the change in magnitude, so that, at a given time and at appropriate depths, the current can be flowing in the opposite direction to that at the surface. The skin depth is a property of the material that varies with the frequency of the applied wave. It can be calculated from the relative permittivity and conductivity of the material and frequency of the wave Thus, in half-metals, the merging of non-equilibrium magnons will cause the generation of terahertz radiation with the frequency that has a maximum at the double magnon frequency. At the threshold pumping rates, the power of terahertz radiation should be an exponential function of pumping rates.

In the U.S. Pat. No. 7,440,178, the tunable generation of terahertz radiation was disclosed. This patent is incorporated by reference herein. In accordance, with the '178 patent, the tuner 86 (of FIG. 4) can be implemented by using a magnetic field in an embodiment of the present technology.

In accordance, with the '178 patent, the tuner 86 (of FIG. 4) can be implemented by using an electric field in an embodiment of the present technology.

In accordance, with the '178 patent, the tuner 86 (of FIG. 4) can be also implemented by using a source of hydrostatic pressure in an embodiment of the present technology.

More specifically, if the tuner 86 (of FIG. 4) is implemented by using a magnetic field, the energy of the magnons depends on the external magnetic field H via the gap in the magnon spectrum. Thus, the frequency of the generated terahertz radiation is also dependent on the external magnetic field.

The magnetic field-induced tunability $t_H = \partial f_r / \partial H$ is as follows:

$$t_H \approx g\mu_B/\pi\hbar = 0.056 \text{ THz/T},\qquad\text{(Eq. 18)}$$

where g is the g-factor (g≈2), and $\mu_B$ is the Bohr magneton. Thus, the field H=1 T tunes the maximum of radiation frequency of 1 THz by approximately 6%.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus for terahertz photon generation comprising:
   a three level magnon laser;
   an injection means; and
   a terahertz antenna; said terahertz antenna further comprising a magnon gain medium; wherein said magnon gain medium supports generation of nonequilibrium magnons.

2. The apparatus of claim 1, wherein said three level magnon laser further comprises:
   a ferromagnetic material having a conduction band that is split into two sub bands, a first said subband having spin up (along the direction of magnetization of said ferromagnetic material), and a second said subband having spin down (opposite to the direction of magnetization of said ferromagnetic material), and said ferromagnetic material further comprising:
   a three-level laser structure further comprising:
      a highest energy level corresponding to a spin-down subband;
      a lowest energy level corresponding to a spin-up subband; wherein electrons injected from an external source of electrons into said highest energy level move into the lower energy electron states in said spin-up subband, and wherein each said injected electron emits a magnon; and
      an intermediate energy level corresponding to said lower energy electron states in said spin-up subband; and wherein said electrons in said spin-up subband move from said intermediate energy level into the bottom of said spin-up subband by emitting optical phonons; and wherein said electrons are injected from said external source of electrons into said highest energy level by using said injection means.

3. The apparatus of claim 2, wherein said ferromagnetic material further comprises:
   a magnon gain medium selected from the group consisting of:
      a ferromagnetic semiconductor; a dilute magnetic semiconductor (DMS); a half-metallic ferromagnet (HMF); and a ferromagnetic conductor, with a gap in the density of states of the minority electrons around the Fermi energy.

4. The apparatus of claim 3, wherein said half-metallic ferromagnet (HMF) is selected from the group consisting of:
   a spin-polarized Heusler alloy; a spin-polarized Colossal magnetoresistance material; $CrO_2$; Sr2FeMoO6; and Fe3O4.

5. The apparatus of claim 2 further comprising:
   a thermostat, wherein said ferromagnetic material is placed in said thermostat, and wherein said thermostat is configured to maintain temperature of said ferromagnetic material below a critical temperature.

6. The apparatus of claim 1; wherein said injection means further comprises:
   an electric field applied to said ferromagnetic material, wherein said electric field is configured to inject non-polarized electrons from an external source into said ferromagnetic material, and wherein said injected spin-down electrons populate said highest energy level.

7. The apparatus of claim 1, wherein said injection means further comprises:
   an electric field applied to said ferromagnetic material, wherein said electric field is configured to inject polarized spin-down electrons from an external source into said highest energy level, wherein said polarized spin-down electrons are polarized in the direction opposite to the direction of magnetization of said ferromagnetic material.

8. The apparatus of claim 1, wherein said terahertz antenna further comprises:
   a log-periodic terahertz antenna.

9. The apparatus of claim 1, wherein said terahertz antenna further comprises:
   a micro machined waveguide terahertz antenna.

10. The apparatus of claim 1, wherein said terahertz antenna further comprises:
    a resonant terahertz antenna.

11. The apparatus of claim 1, wherein said terahertz antenna further comprises:
    a non-resonant terahertz antenna.

12. An apparatus for tunable terahertz photon generation comprising:
- a three level magnon laser;
- an injection means;
- a terahertz antenna; said terahertz antenna further comprising a magnon gain medium; wherein said magnon gain medium supports generation of nonequilibrium magnons; and
- a tuning means for tuning frequency of said photons emitted by said terahertz antenna.

13. The apparatus of claim 12, wherein said tuning means further comprises:
- a means for applying an external magnetic field; and
- a means for causing changes in a value of said external magnetic field.

14. The apparatus of claim 12, wherein said tuning means further comprises:
- a means for applying an external hydrostatic pressure; and
- a means for causing changes in a value of said external hydrostatic pressure.

15. The apparatus of claim 12, wherein said tuning means further comprises:
- a means for applying an external electric field; and
- a means for causing changes in a value of said external electric field.

16. A method for terahertz photon generation comprising:
- (A) providing a three level magnon laser;
- (B) providing an injection means;
- (C) providing a terahertz antenna; said terahertz antenna further comprising a magnon gain medium; wherein said magnon gain medium supports generation of nonequilibrium magnons;
- (D) generating nonequilibrium magnons by injecting minority carriers into a highest energy level corresponding to a spin-down subband in said three level magnon laser; and
- (E) generating terahertz photons by using merging processes between said generated nonequilibrium magnons.

17. The method of claim 16, wherein said step (E) further comprises:
- (E1) generating terahertz photons in said three level magnon laser by using merging processes between said generated nonequilibrium magnons; wherein said terahertz antenna is configured to emit said generated terahertz photons.

18. The method of claim 16, wherein said step (E) further comprises:
- (E2) generating terahertz photons in said terahertz antenna by using merging processes between said generated nonequilibrium magnons; wherein said terahertz antenna is configured to emit said generated terahertz photons.

19. A method for terahertz photon generation comprising:
- (A) providing a three level magnon laser;
- (B) providing an injection means;
- (C) providing a terahertz antenna; said terahertz antenna further comprising a magnon gain medium; wherein said magnon gain medium supports generation of nonequilibrium magnons;
- (D) generating nonequilibrium magnons by injecting minority carriers into a highest energy level corresponding to a spin-down subband in said three level magnon laser;
- (E) generating terahertz photons by using merging processes between said generated nonequilibrium magnons; and
- (F) tuning frequency of said terahertz photons emitted by said terahertz antenna.

20. The method of claim 16, wherein said step (F) further comprises:
- (F1) tuning frequency of said terahertz photons emitted by applying an external magnetic field.

21. The method of claim 16, wherein said step (F) further comprises:
- (F2) tuning frequency of said terahertz photons emitted by applying an external hydrostatic pressure.

22. The method of claim 16, wherein said step (F) further comprises:
- (F3) tuning frequency of said terahertz photons emitted by applying an external electric field.

\* \* \* \* \*